United States Patent
Holstege et al.

(10) Patent No.: US 9,092,507 B2
(45) Date of Patent: Jul. 28, 2015

(54) APPARATUS AND METHOD FOR COMPUTING N-WAY CO-OCCURRENCES OF DATA TUPLES IN SCALAR INDEXES

(71) Applicant: MarkLogic Corporation, San Carlos, CA (US)

(72) Inventors: Mary Holstege, Cupertino, CA (US); Christopher Lindblad, Berkeley, CA (US)

(73) Assignee: MarkLogic Corporation, San Carlos, CA (US)

( * ) Notice: Subject to any disclaimer, the term of this patent is extended or adjusted under 35 U.S.C. 154(b) by 132 days.

(21) Appl. No.: 13/742,234

(22) Filed: Jan. 15, 2013

(65) Prior Publication Data
US 2014/0201211 A1   Jul. 17, 2014

(51) Int. Cl.
*G06F 17/30* (2006.01)

(52) U.S. Cl.
CPC .... *G06F 17/30619* (2013.01); *G06F 17/30675* (2013.01)

(58) Field of Classification Search
CPC ................................................ G06F 17/30619
USPC .................................... 707/741, 711
See application file for complete search history.

(56) References Cited

U.S. PATENT DOCUMENTS

| | | | | |
|---|---|---|---|---|
| 5,832,479 A * | 11/1998 | Berkowitz et al. | | 1/1 |
| 6,507,846 B1 * | 1/2003 | Consens | | 1/1 |
| 7,925,678 B2 * | 4/2011 | Botros et al. | | 707/803 |
| 8,019,659 B2 * | 9/2011 | Musgrove et al. | | 705/27.1 |
| 8,516,008 B1 * | 8/2013 | Marquardt et al. | | 707/802 |
| 8,793,231 B2 * | 7/2014 | Cragun et al. | | 707/696 |
| 2007/0271249 A1 * | 11/2007 | Cragun et al. | | 707/3 |
| 2010/0005054 A1 * | 1/2010 | Smith et al. | | 707/2 |
| 2010/0191373 A1 * | 7/2010 | Kim et al. | | 700/250 |
| 2011/0289091 A1 * | 11/2011 | Collins et al. | | 707/741 |
| 2012/0179712 A1 * | 7/2012 | Bestgen et al. | | 707/769 |
| 2013/0339370 A1 * | 12/2013 | Holstege et al. | | 707/743 |
| 2014/0081982 A1 * | 3/2014 | Hung | | 707/741 |

* cited by examiner

*Primary Examiner* — Debbie Le
(74) *Attorney, Agent, or Firm* — Cooley LLP

(57) ABSTRACT

A non-transitory computer readable storage medium includes executable instructions to receive primary matched values with corresponding document identifications. The primary matched values correspond to a specified primary value, for example expressed in a search query. A secondary scalar index is scanned to match the document identifications with secondary matched values with corresponding secondary values. A tertiary scalar index is scanned to match the document identifications with tertiary matched values with corresponding tertiary values. The secondary values and tertiary values are provided as tuples. Each tuple has the specified primary value, a secondary value, a tertiary value and frequency indicia.

9 Claims, 7 Drawing Sheets

US 9,092,507 B2

APPARATUS AND METHOD FOR COMPUTING N-WAY CO-OCCURRENCES OF DATA TUPLES IN SCALAR INDEXES

FIELD OF THE INVENTION

This invention relates generally to data processing. More particularly, this invention relates to the identification of co-occurrences of data tuples in scalar indexes.

BACKGROUND OF THE INVENTION

A scalar value is a primitive data type, such as a Boolean data type, a numeric data type (e.g., integer, floating point, double floating point), character type (e.g., character, string), date/time values, geospatial points or other values.

A scalar index specifies a scalar value and a document identification or id. A search query may result in the evaluation of a set of scalar indexes. A co-occurrence is the presence of a scalar value from one index with a scalar value from another index associated with the same document id. A tuple is an ordered list of elements.

It would be desirable to provide improved techniques for processing scalar indexes, and in particular, n-way co-occurrences of data tuples in scalar indexes.

SUMMARY OF THE INVENTION

A non-transitory computer readable storage medium includes executable instructions to receive primary matched values with corresponding document identifications. The primary matched values correspond to a specified primary value, for example expressed in a search query. A secondary scalar index is scanned to match the document identifications with secondary matched values with corresponding secondary values. A tertiary scalar index is scanned to match the document identifications with tertiary matched values with corresponding tertiary values. The secondary values and tertiary values are provided as tuples. Each tuple has the specified primary value, a secondary value, a tertiary value and frequency indicia.

A non-transitory computer readable storage medium includes executable instructions to receive scalar indexes, The scalar indexes are chained through using a document identification value to produce sub-tuples. The sub-tuples are combined to form tuples responsive to a query.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
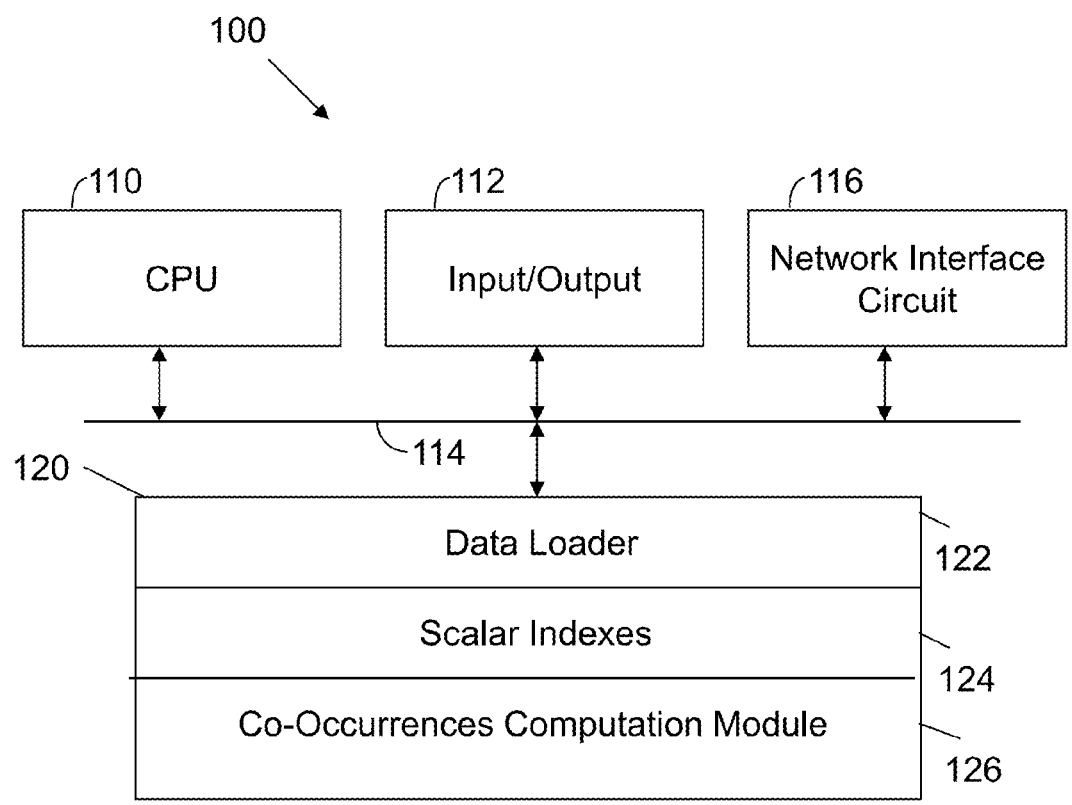
FIG. 1 illustrates a computer that may be utilized in accordance with an embodiment of the invention.

FIG. 1 illustrates a computer 100 configured in accordance with an embodiment of the invention. The computer 100 includes standard components, such as a central processing unit 110 and input/output devices 112 connected via a bus 114. The input/output devices may include a keyboard, mouse, display and the like. A network interface circuit 116 is also connected to the bus 114. Thus, the computer 100 may operate in a networked environment.

A memory 120 is also connected to the bus 114. The memory 120 includes data and executable instructions to implement operations of the invention. A data loader 122 includes executable instructions to process documents and form scalar indexes 124. The memory 120 also stores a co-occurrences computation module 126. The co-occurrences computation module 126 includes executable instructions to perform operations of the invention, as discussed below.

The modules in memory 120 are exemplary. These modules may be combined. The modules may be implemented on any number of machines in a networked environment. It is the operations of the invention that are significant, not the particular architecture by which the operations are implemented.

Figure 2:
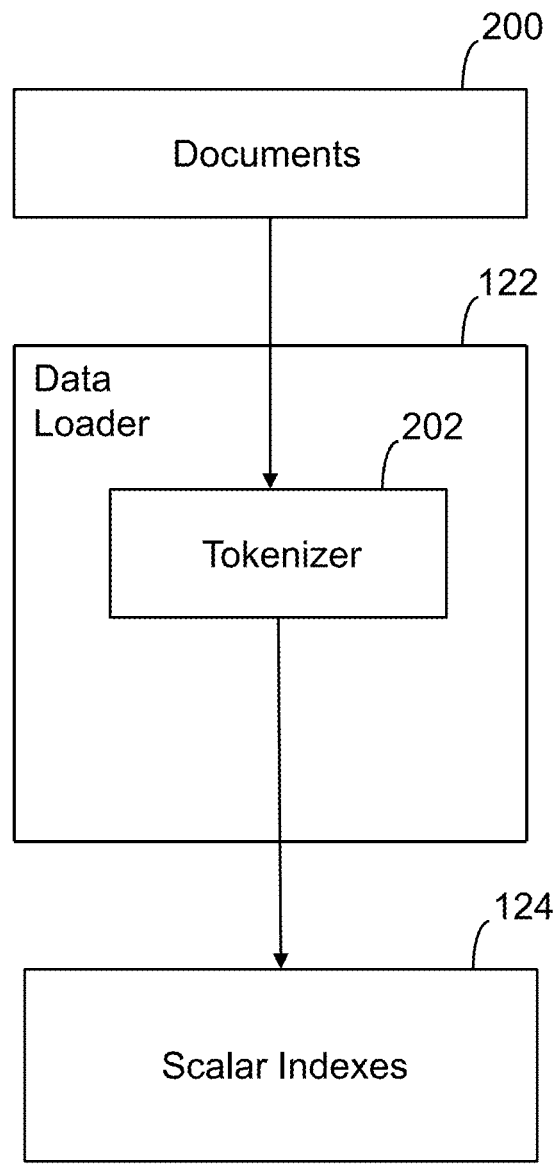
FIG. 2 illustrates components used to construct scalar indexes.

FIG. 2 illustrates interactions between components used to implement an embodiment of the invention. Documents 200 are delivered to the data loader 122. The data loader 122 may include a tokenizer 202, which includes executable instructions to produce tokens or segments for components in each document. Each token may be a scalar value that is associated with a document id. Thus, scalar indexes 124 are formed.

The scalar indexes 124 support point searches. In a point search a user is looking for a particular value (e.g., scalar value). For example, the query may request the last names of people with first-name="John". The search results provide the different last names (and optionally the number of such occurrences) and the document ids.

Figure 3:
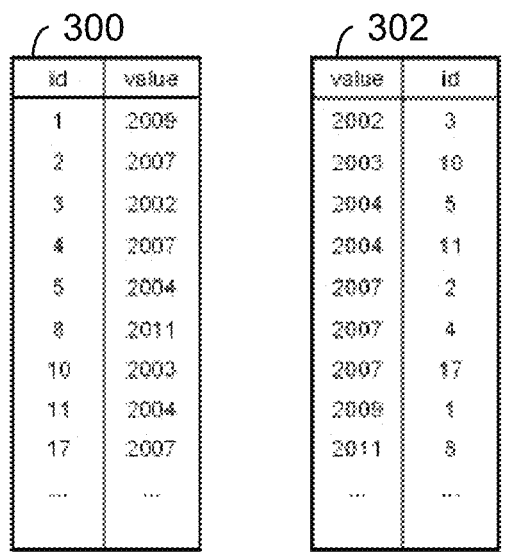
FIG. 3 illustrates exemplary scalar indexes.

FIG. 3 illustrates a first scalar index 300 sorted by document id. In this example, each document id has an associated scalar value of a specified year. The second scalar index 302 has the same values as the first scalar index 300, but the second scalar index is sorted by scalar values. Scalar indexes may be examined either in value order (with the document id as the secondary sort key) or in document id order (with the value order as the secondary sort key).

A full text search identifies document ids that match a query. A query with multiple parameters may return different scalar indexes for the different parameters. An embodiment of the invention chains through a set of scalar indexes that are responsive to a query. Partial tuples are formed from one end of the scalar index sequence to another end of the scalar index sequence. Partial tuples are combined with a current value to produce a larger partial tuple, all the way back to the original index. Thus, tuples can be generated in an incremental fashion with a single linear scan of a primary index.

Figure 4:
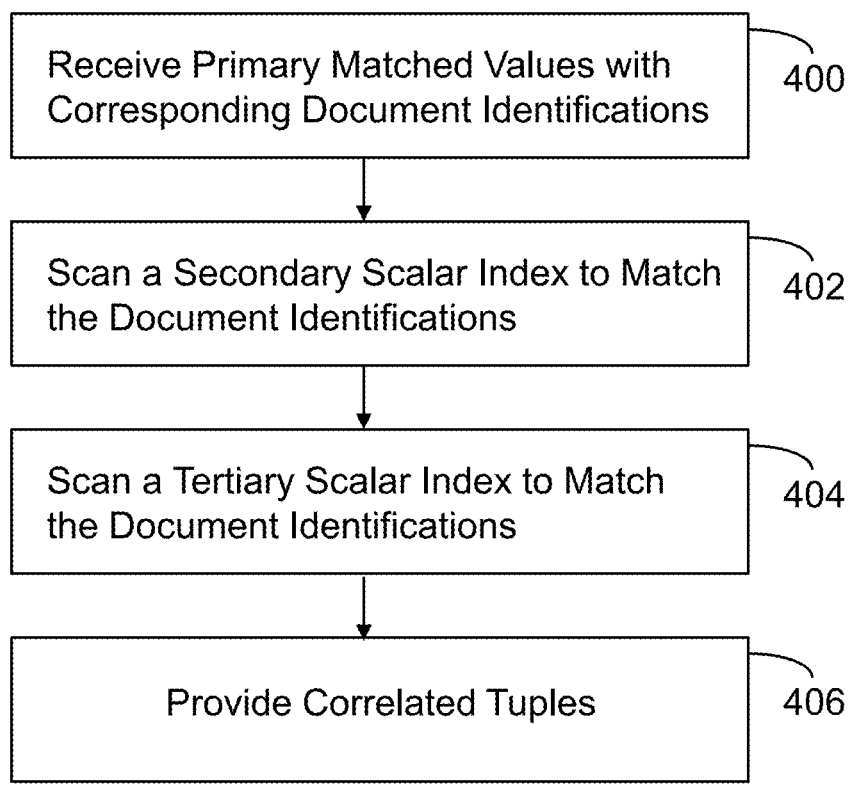
FIG. 4 illustrates processing operations associated with the co-occurrences computation module.

These operations are performed by the co-occurrences computation module 126. FIG. 4 illustrates processing operations associated with the co-occurrences computation module 126. Initially, primary matched values are received 400. The primary matched values have corresponding document identifications. The primary matched values are identified in response to a search query that specifies the primary matched values.

Figure 5:
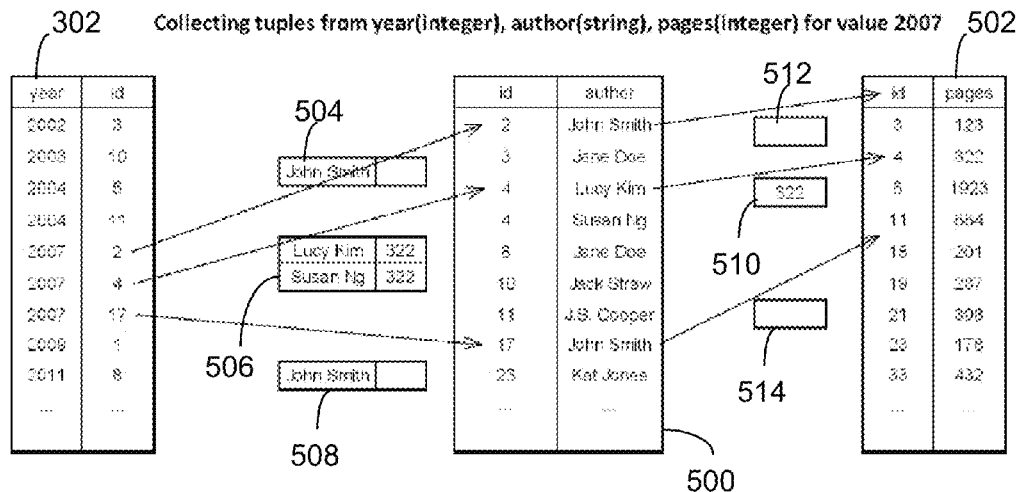
FIG. 5 illustrates a chain of scalar index collectors utilized in accordance with an embodiment of the invention.

FIG. 5 illustrates the scalar index 302 of FIG. 3. This scalar index is supplied in response to a match on a search term that includes the scalar value specifying the year 2007. In this example, multiple documents (doc ids 2, 4 and 17) include the scalar value 2007.

The next operation of FIG. 4 is to scan a secondary scalar index to match the document identifications 402. The secondary scalar index has doc ids and secondary values. FIG. 5 illustrates an example secondary scalar index 500. This scalar index has secondary values corresponding to a scalar type of string specifying an author. The scalar index 500 is responsive to a query that specified an author string.

The next operation of FIG. 4 is to scan a tertiary scalar index to match the document identifications 404. The tertiary scalar index has doc ids and tertiary values. FIG. 5 illustrates an example tertiary index 502. This scalar index has tertiary values corresponding to a scalar type of integer specifying pages in a book. The scalar index 502 is responsive to a query.

Operations 402 and 404 may be viewed as a collection phase of processing. Any number of additional linked indexes may be scanned in the collection phase. An additional phase of processing may be viewed as a dispensing phase where correlated tuples are provided 406. The correlated tuples constitute information responsive to a query.

Returning to FIG. 5, in this example, there is a primary index 302, a secondary index 500 and a tertiary index 502. These indexes are received in response to a query that specifies a year and an author. An additional constraint of a page within a document may be expressed or implied. Any number of query processing techniques may be used to generate the scalar indexes. The query may be of any type. The invention is directed towards the processing of scalar indexes, not the manner of forming such indexes or query processing that produces such indexes.

Suppose that the primary value of interest is the year 2007. The primary index 302 has three document ids for this value, namely doc ids 2, 4 and 17. These doc ids may be correlated with the secondary index 500. The secondary index 500 has a doc id of 2 with a corresponding secondary value of John Smith. Thus, a sub-tuple 504 may be collected. The secondary index 500 has two doc ids with the value of 4. These doc ids have corresponding secondary values of Lucy Kim and Susan Ng. Thus, sub-tuples 506 may be collected. Finally, the secondary index 500 has a doc id of 17 with a corresponding value of John Smith. Thus, sub-tuple 508 may be collected.

In this example, only document id 4 has a value in the next index 502. The document id 4 has a corresponding tertiary value of 322, which is a page number that may be used to form sub-tuple 510. Null sub-tuples 512 and 514 may also be formed to represent the null values associated with doc ids 2 and 17.

Figure 6:
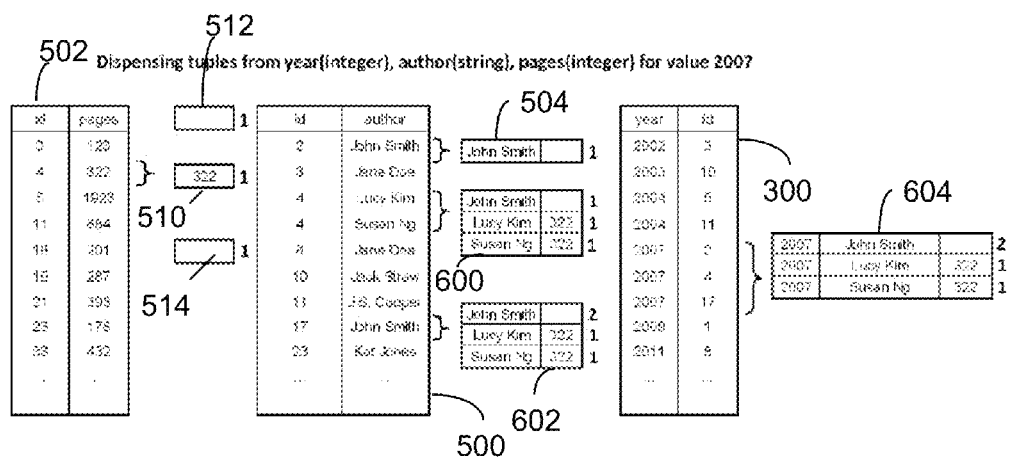
FIG. 6 illustrates tuple collection operations performed in accordance with an embodiment of the invention.

Correlated tuples may now be provided through a dispensing operation. As shown in FIG. 6, dispensing may begin at the last index in the sequence, in this case tertiary index 502. This index has collected sub-tuples 510, 512 and 514 associated with it. These may be provided to the secondary index 500. The sub-tuple 504 may be combined with sub-tuple 506 to form sub-tuples 600. This may be further combined with sub-tuple 508 to form sub-tuples 602. The two null values associated with John Smith are combined and a frequency indicia of "2" is associated with the value John Smith. These sub-tuples are provided to the primary index 300 where they are further combined with the primary value 2007 to form tuples 604. In this example, each tuple has the specified primary value (2007), a secondary value (author) and a tertiary value (page) and frequency indicia, 2 in the case of John Smith and 1 in the case of both Lucy Kim and Susan Ng.

Figure 7:
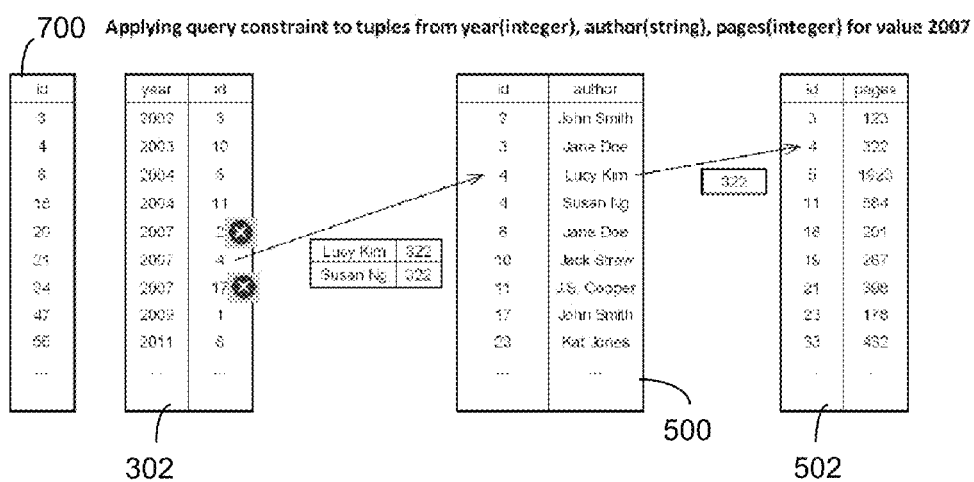
FIG. 7 illustrates tuple dispensing operations performed in accordance with an embodiment of the invention.

FIG. 7 illustrates how a query constraint is applied during tuple generation. First a search query is evaluated to produce a set of document ids 700. The primary index 302 is scanned in value order. Values whose corresponding ids are not in the set 700 are excluded from further consideration. Since neither 2 nor 17 is in the set of ids 700 returned from the query, for the value 2007 only sub-tuples for the id 4 are considered, giving rise to just two sub-tuples ("Lucy Kim", 322) and ("Susan Ng", 322).

Figure 8:
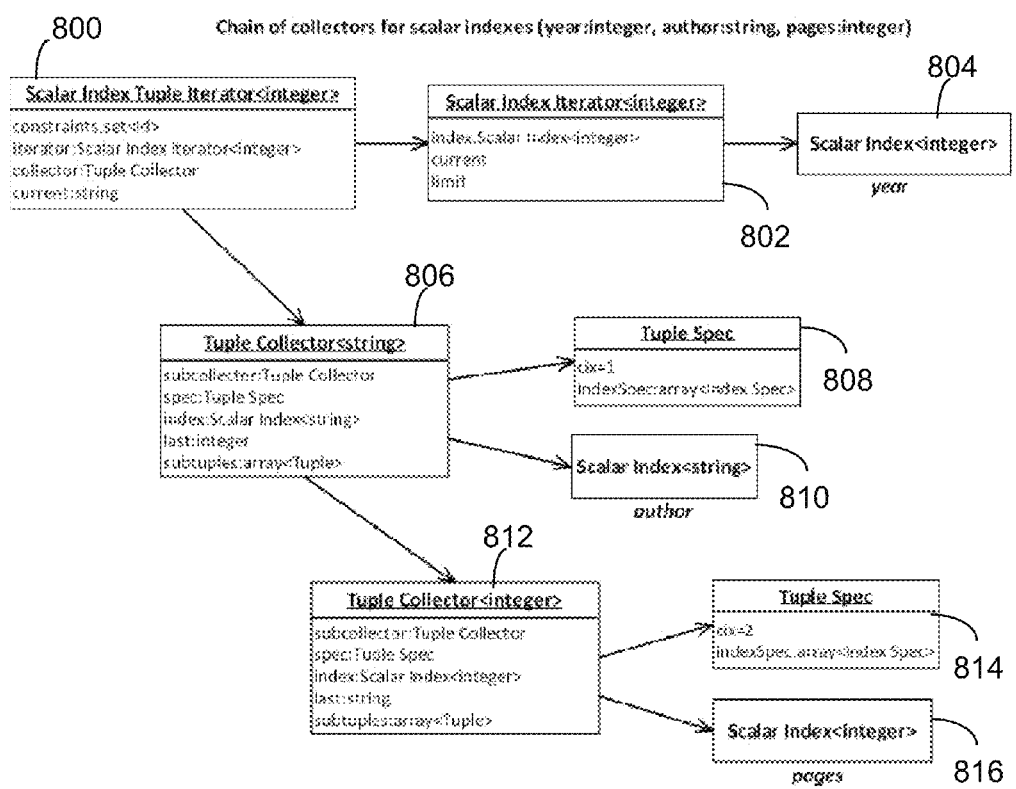
FIG. 8 illustrates query constraint operations performed in accordance with an embodiment of the invention.

FIG. 8 shows how the collectors for sub-tuples are chained together with a top level tuple iterator, so that for each column in the tuple after the first one, there is a collector that has information about the column type and the size of the remaining sub-tuple and the types of the slots, so that sorting can happen correctly. Block 800 specifies a scan of a primary index for an integer value. The block also has information on a nested collector block 806. Block 802 specifies the span of the scan in the primary index. Block 804 provides the matched values, in this case, the year 2007.

Block 806 is an execution block for collecting the author string field. The block also has information on the next nested collector block 812. Block 808 is a tuple specification. Block 810 shows a string value, in this case, for author. Nested block 812 operates on the tertiary index to obtain integer page values. Block 814 is a tuple specification. Block 816 shows an integer value, in this case, a page number.

In sum, scalar values are placed into ordered scalar indexes that map document ids to values and vice versa. Values to be extracted are identified by various means, such as by element names, by selection of a path (perhaps with conditional constraints in the document structure), by concatenation of included and excluded element values, and by the correlation of paired values (e.g., to define a point value). Tuples are then generated by scanning the indexes and correlating the values by document id.

One embodiment of the tuple generation technique may be characterized as follows:

get the start/end limit on the first index (value order) by
        binary search on boundary values
    while values are still in range:
        get next item in first index (value order)
        collect tuples for the id of the value:
            get the start/end limit on the next index (id order)
            for each value in that id:
                collect sub-tuples for the id (next index)
                consolidate sub-tuples with current value
        for each item in first index with same value:
            collect tuples for the id of the value
        dispense each of those tuples:
            sort the tuples
            set the current frequency and 1st value
            dispense the sub-tuple (next index):
                set the nth value
                dispense the sub-tuple (next index)

Notice that all the sub-tuples for range indexes 2 through N will be collected for each value on the first index.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known non-transitory computer usable medium such as semiconductor, magnetic disk, or optical disc (e.g., CD-ROM, DVD-ROM, etc.). It is understood that a CPU, processor core, microcontroller, or other suitable electronic hardware element may be employed to enable functionality specified in software.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A non-transitory computer readable storage medium, comprising executable instructions to:
    receive primary matched values with corresponding document identifications, wherein the primary matched values correspond to a specified primary value;
    scan a secondary scalar index to match the document identifications with secondary matched values with corresponding secondary values;
    scan a tertiary scalar index to match the document identifications with tertiary matched values with corresponding tertiary values; and
    provide the secondary values and tertiary values as tuples, where each tuple has the specified primary value, a secondary value, a tertiary value and frequency indicia;
    wherein the secondary scalar index and the tertiary scalar index are each a two column index with a document identifications column and a values column to facilitate mappings of document identifications to values and vice versa.

2. The non-transitory computer readable storage medium of claim 1 wherein the secondary value and the tertiary value are different scalar types.

3. The non-transitory computer readable storage medium of claim 1 wherein the frequency indicia includes a null value.

4. The non-transitory computer readable storage medium of claim 1 wherein scanning of the secondary scalar index is modified in response to a query constraint.

5. A non-transitory computer readable storage medium, comprising executable instructions to:
    receive a plurality of scalar indexes, wherein each scalar index is a two column index with a document identifications column and a values column to facilitate mappings of document identifications to values and vice versa;
    chain through the plurality of scalar indexes using a document identification value to produce sub-tuples; and
    combine the sub-tuples to form tuples responsive to a query, wherein the tuples comprise values from the values columns of the plurality of scalar indexes.

6. The non-transitory computer readable storage medium of claim 5 wherein the tuples include at least a first value, a second value and frequency indicia.

7. The non-transitory computer readable storage medium of claim 6 wherein the frequency indicia includes a null value.

8. The non-transitory computer readable storage medium of claim 6 wherein the first value and the second value are different scalar types.

9. The non-transitory computer readable storage medium of claim 5 wherein the executable instructions to chain observe a query constraint.

* * * * *